(12) United States Patent
Dezouche et al.

(10) Patent No.: US 11,767,767 B2
(45) Date of Patent: Sep. 26, 2023

(54) TURBOMACHINE STATOR SECTOR HAVING FLEXIBLE REGIONS SUBJECTED TO HIGH STRESS

(71) Applicant: SAFRAN AIRCRAFT ENGINES, Paris (FR)

(72) Inventors: Laurent Gilles Dezouche, Moissy-Cramayel (FR); Sophie Martine Jobez, Moissy-Cramayel (FR); Julien Marc Antoine Prevost, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/425,410

(22) PCT Filed: Jan. 14, 2020

(86) PCT No.: PCT/FR2020/050047
§ 371 (c)(1),
(2) Date: Jul. 23, 2021

(87) PCT Pub. No.: WO2020/157405
PCT Pub. Date: Aug. 6, 2020

(65) Prior Publication Data
US 2022/0090508 A1    Mar. 24, 2022

(30) Foreign Application Priority Data

Jan. 30, 2019  (FR) .................................... 1900872

(51) Int. Cl.
*F01D 11/00*      (2006.01)
*B22F 5/00*       (2006.01)
(Continued)

(52) U.S. Cl.
CPC ............ *F01D 11/001* (2013.01); *B22F 5/009* (2013.01); *B33Y 80/00* (2014.12); *F01D 25/24* (2013.01);
(Continued)

(58) Field of Classification Search
CPC ........ F01D 9/042; F01D 25/04; F01D 11/001; F01D 25/246; F01D 5/225; F01D 9/041;
(Continued)

(56) References Cited

U.S. PATENT DOCUMENTS

| 3,778,184 | A  |   | 12/1973 | Wood |
| 7,946,811 | B2 | * | 5/2011  | Abgrall ................. F04D 29/542 415/191 |

(Continued)

FOREIGN PATENT DOCUMENTS

| EP | 1811131 A2 | 7/2007 |
| EP | 3091216 A1 | 11/2016 |
| EP | 3330485 A1 | 6/2018 |

OTHER PUBLICATIONS

International Search Report in International Application No. PCT/FR2020/050047, dated May 15, 2020 (3 pages).
(Continued)

*Primary Examiner* — Eric J Zamora Alvarez
(74) *Attorney, Agent, or Firm* — Bookoff McAndrews, PLLC

(57) ABSTRACT

A turbine stator sector includes a plurality of vanes extending along a radial direction between a first end and a second end and along an axial direction between a leading edge and a trailing edge. The sector further includes an internal shroud linked to the first end of the vanes and an external shroud linked to the second end of the vanes. The sector includes at least one annular portion forming all or part of the internal shroud or of the external shroud. The annular portion
(Continued)

includes a first partition present at the junction with the first or the second end of the vanes and a second partition held spaced from the first partition along the radial direction by a three-dimensional structure including a plurality of cutouts.

10 Claims, 8 Drawing Sheets

(51) Int. Cl.
*B33Y 80/00* (2015.01)
*F01D 25/24* (2006.01)
*F01D 25/06* (2006.01)
*F01D 25/04* (2006.01)
*B33Y 10/00* (2015.01)

(52) U.S. Cl.
CPC .......... *B33Y 10/00* (2014.12); *F05D 2220/30* (2013.01); *F05D 2230/31* (2013.01); *F05D 2240/11* (2013.01); *F05D 2240/12* (2013.01)

(58) Field of Classification Search
CPC .......... F01D 21/045; F01D 25/06; F01D 5/26; F01D 25/26; F01D 5/00; F01D 5/16; F01D 9/02; F05D 2250/283; F05D 2220/30; F05D 2230/31; F05D 2240/11; F05D 2240/125; F05D 2240/80; F05D 2240/12; F05D 2270/114; F04D 29/542; F04D 29/668; F04D 29/526

See application file for complete search history.

(56) References Cited

U.S. PATENT DOCUMENTS

| | | | |
|---|---|---|---|
| 8,403,634 B2 * | 3/2013 | Arness | F01D 11/005 |
| | | | 415/189 |
| 9,533,485 B2 * | 1/2017 | Marshall | B22F 10/20 |
| 9,957,980 B2 * | 5/2018 | Englebert | F04D 29/102 |
| 10,830,102 B2 * | 11/2020 | Martin | B22F 5/009 |
| 2003/0031556 A1 | 2/2003 | Mulcaire et al. | |
| 2007/0172349 A1 | 7/2007 | Abgrall et al. | |
| 2017/0234143 A1 * | 8/2017 | Snyder | F01D 25/12 |
| | | | 165/51 |

OTHER PUBLICATIONS

French Search Report in French Patent Application No. 1900872, dated Oct. 11, 2019 (2 pages).

* cited by examiner

[Fig. 1]
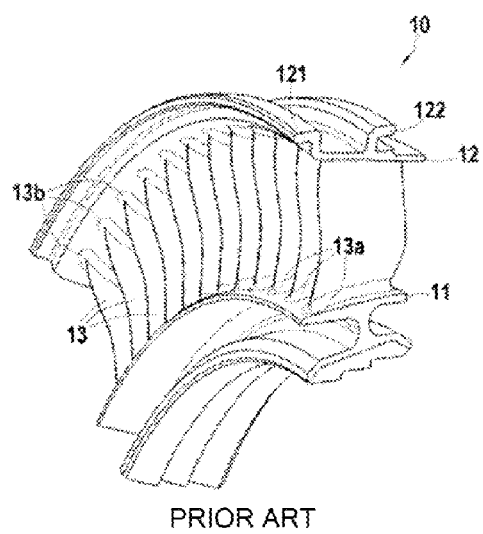
PRIOR ART

[Fig. 2]
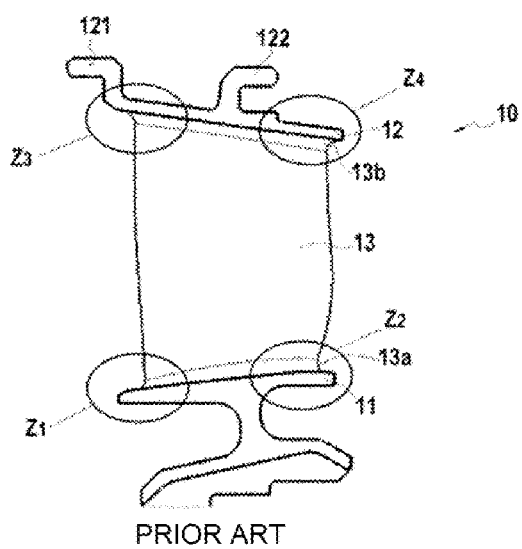
PRIOR ART

[Fig. 3]
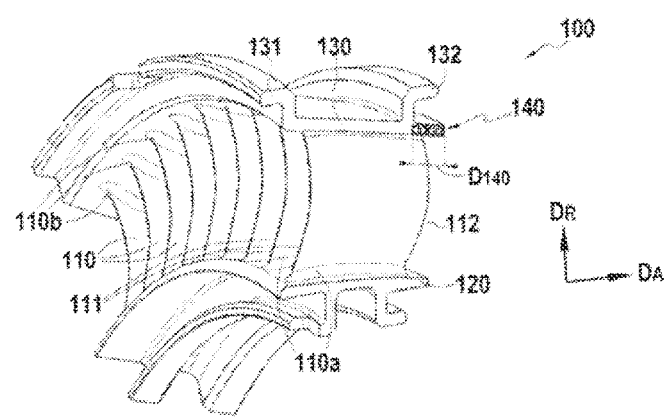

[Fig. 4]
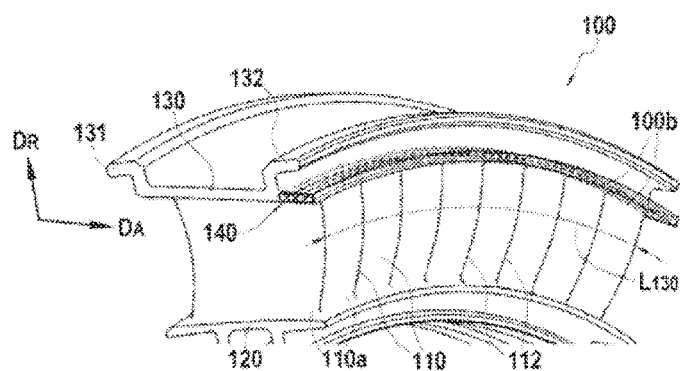

[Fig. 5]
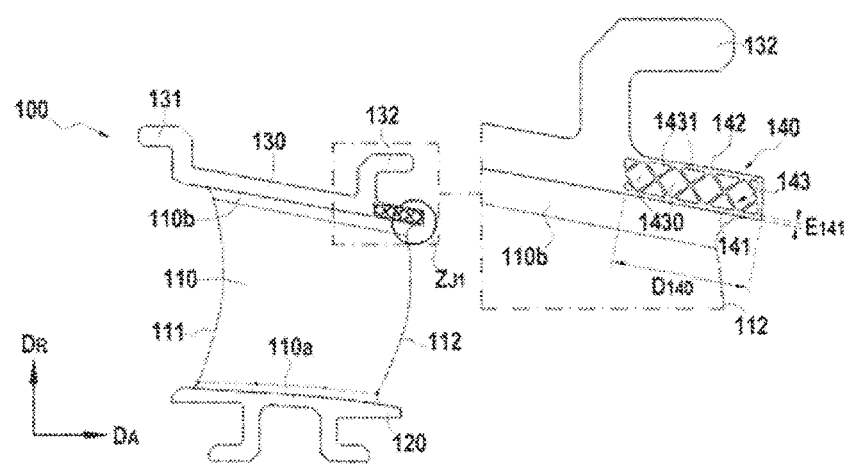

[Fig. 6]
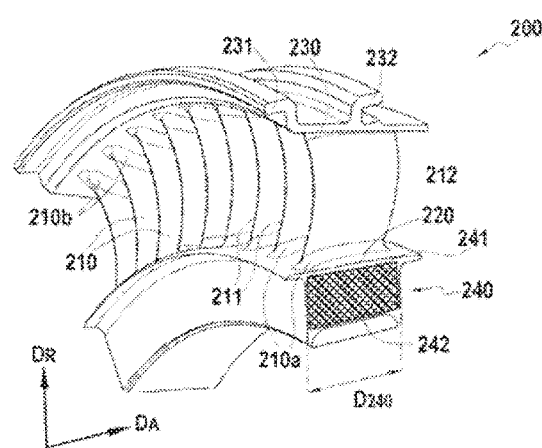

[Fig. 7]
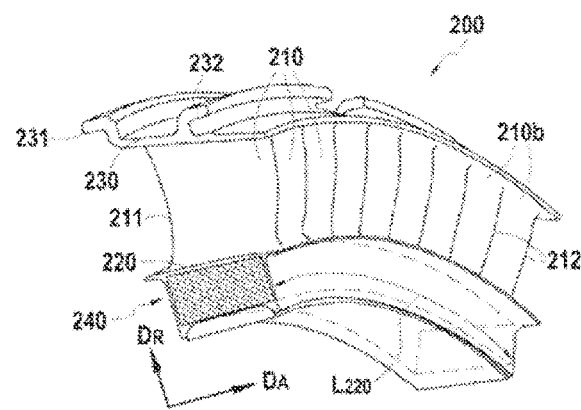

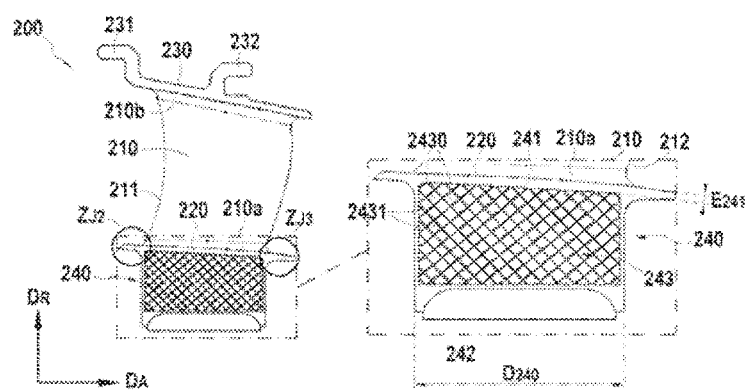
[Fig. 8]

TURBOMACHINE STATOR SECTOR HAVING FLEXIBLE REGIONS SUBJECTED TO HIGH STRESS

CROSS-REFERENCE TO RELATED APPLICATION(S)

This application is the U.S. national phase entry under 35 U.S.C. § 371 of International Application No. PCT/FR2020/050047, filed on Jan. 14, 2020, which claims priority to French Patent Application No. 1900872, filed on Jan. 30, 2019.

BACKGROUND OF THE INVENTION

The present invention relates to the general field of straighteners for the compressor of an aeronautical turbomachine such as an airplane turbojet or a turboprop.

A turbomachine compressor is composed of several compression stages, each formed from an annular row of vanes mounted on a rotor shaft and by a straightener formed by a plurality of vanes mounted radially on an annular external casing of the turbomachine.

A compressor straightener is generally sectored, i.e. constituted of several angular sectors set end to end circumferentially around the longitudinal axis of the compressor. More precisely, as illustrated in FIG. 1, each straightener sector 10 includes an internal shroud 11 and an external shroud 12 arranged coaxially one inside the other, and several vanes or vanes 13 extending radially between the shrouds and connected to them by their respective radial ends 13a and 13b. Moreover, at each of its axial ends, the external shroud 12 of each straightener sector 10 includes respectively protruding tabs 121 and 122 for assembling the sector to the external casing of the turbomachine.

In operation, a straightener sector of this type is subjected to numerous mechanical loads, both static and vibrational. In particular, strong vibrational responses are observed on the straightener sectors, the latter possibly causing sector damage over time (cracks, ruptures, etc.). These mechanical loads are essentially supported at the junction zones between the leading and trailing edges of the vanes and the internal and external shrouds corresponding to the zones $Z_1$, $Z_2$, $Z_3$ and $Z_4$ shown in FIG. 2. In fact, these junction zones correspond to a sudden change of material volume between the massive parts and the thin parts in the sector. This induces stiffness at the junction zones which then become zones of strong mechanical stresses which can lead to damage, even destruction of the straightener sector.

One solution for reducing mechanical stresses at the junctions between the leading and trailing edges of the vanes and the external shroud of a straightener sector is described in document US2007172349. The solution mentioned in this document is not, however, completely satisfactory. In particular, as regards vibration, this solution does not contribute sufficient damping at the junction zones between the leading and trailing edges of the vanes and the internal and external shrouds.

OBJECT AND SUMMARY OF THE INVENTION

The present invention therefore has as its main object to remedy disadvantages of this type by proposing a turbine stator sector comprising a plurality of vanes extending along a radial direction between a first end and a second end and along an axial direction between a leading edge and a trailing edge, said sector further comprising an internal shroud linked to the first end of the vanes and an external shroud linked to the second end of the vanes, characterized in that it comprises at least one annular portion forming all or part of the internal shroud or of the external shroud, said at least one annular portion comprising a first partition present at the junction with the first or second end of the vanes and a second partition held spaced from the first partition along a radial direction by a three-dimensional structure including a plurality of cutouts.

By contributing additional flexibility, the annular portion allows significantly improving the mechanical strength of the stator sector at the junctions between the ends of the vanes and the internal and external shrouds. Large static and dynamic stresses are thus better compensated and/or absorbed in these junction zones where the stresses are large.

The annular portion(s) can form all or part of the internal shroud or of the external shroud along the axial direction and/or along the circumferential direction of the turbine stator sector.

According to one particular feature of the stator sector of the invention, the first partition has a thickness of less than 1 mm. Greater flexibility at the junction with the first or the second end of the vanes is thereby conferred.

According to another particular feature of the stator sector of the invention, the three-dimensional structure consists of an array of crosspieces or of cavities.

According to another particular feature of the stator sector of the invention, the downstream end of the external shroud is formed by an annular portion, the first partition of the annular portion being linked to the second end of the vanes at the trailing edge of said vanes.

According to another particular feature of the stator sector of the invention, the internal shroud is entirely formed by an annular portion, the first partition of the annular portion being linked to the first end of the vanes.

The invention also relates to a turbomachine stator and particularly a turbomachine straightener, formed of a plurality of sectors as previously defined, the stator or straightener forming part of a turbomachine compressor.

The invention also relates to a turbomachine equipped with a compressor according to the invention.

The invention also has as its object a method for manufacturing a turbomachine stator sector comprising the production of a plurality of vanes extending along a radial direction between a first end and a second end and along an axial direction between a leading edge and a trailing edge, of an internal shroud linked to the first end of the vanes and of an external shroud linked to the second end of the vanes, characterized in that the method further comprises the production by additive manufacturing of at least one annular portion over all or part of at least the internal shroud or the external shroud along the axial direction, said at least [one] annular portion comprising a first partition present at the junction with the first or second end of the vanes, a second partition held spaced from the first partition along the radial direction by a three-dimensional structure including a plurality of cutouts.

According to a particular feature of the method of the invention, the first partition has a thickness of less than 1 mm.

According to another particular feature of the method of the invention, the three-dimensional structure consists of a network of crosspieces or of cavities.

According to another particular feature of the method of the invention, an annular portion is formed at the downstream end of the external shroud, the first partition of the annular portion being linked to the second end of the vanes at the trailing edge of said vanes.

According to another particular feature of the method of the invention, an annular portion is formed over the entire internal shroud, the first partition of the annular portion being linked to the first end of the vanes.

BRIEF DESCRIPTION OF THE DRAWINGS

Other features and advantages of the present invention will be revealed by the description given below, with reference to the appended drawings which illustrate embodiments of it without any limiting character. In the figures:

FIG. 1 is a schematic perspective view of a straightener sector according to the prior art;

FIG. 2 is a side view of the straightener sector of FIG. 1;

FIGS. 3 and 4 are schematic perspective views of a turbine stator sector in conformity with one embodiment of the invention;

FIG. 5 is a side view of the straightener sector of FIGS. 3 and 4;

FIGS. 6 and 7 are schematic perspective views of a turbine stator sector in conformity with another embodiment of the invention;

FIG. 8 is a side view of the straightener sector of FIGS. 6 and 7.

DETAILED DESCRIPTION OF EMBODIMENTS

FIGS. 3, 4 and 5 illustrate a turbine stator sector 100 in conformity with one embodiment of the invention. The stator sector 100 which is intended here to form a part of a high-pressure straightener in a turbine comprises a plurality of vanes or of vanes 110 extending along a radial direction DR between a first end 110a and a second end 110b and along an axial direction DA between a leading edge 111 and a trailing edge 112. The sector 100 further comprises an internal shroud 120 linked to the first end 110a of the vanes 110 and an external shroud 130 linked to the second end 110b of the vanes 110. The external shroud 130 includes protruding tabs 131 and 132 offset along the axial direction DA for the assembly of the sector to an external turbine casing.

In conformity with the invention, the stator sector 100 comprises an annular portion 140 forming here the downstream edge of the external shroud 130 along the axial direction DA located at the junction with the trailing edges 112 of the vanes 110. The annular portion 140 extends in the axial direction DA over a length $D_{140}$ less than the total width of the external shroud 130 (FIGS. 3 and 5) and over the entire circumferential length $L_{130}$ of the external shroud 130 (FIG. 4). The annular portion 140 includes a first partition 141 present at the junction with the second end 110b of the vanes 110 towards the trailing edge 112 and a second partition 142 held spaced from the first partition 141 along the radial direction DR by a three-dimensional structure 143 including a plurality of cutouts 1430 (FIG. 5). In the example described here, the three-dimensional structure 142 consists of an array of crosspieces 1431 defining between them the cutouts 1430. What is meant here by "held spaced" is that the three-dimensional structure is in contact with the first and second partitions and constitutes the element which links these two partitions while maintaining a space between them.

The first partition 141, which is located at the junction zone $Z_{J1}$ between the trailing edges 112 of the vanes 110 and the external shroud 130 (FIG. 5), has a small thickness $E_{141}$ in order to contribute flexibility in this stress zone. The first partition 141 preferably has a thickness of less than 1 mm, more preferably a thickness of approximately 0.2 mm. Due to its geometry, the three-dimensional structure 143 also contributes additional flexibility in the junction zone $Z_{J1}$.

By contributing additional flexibility, the portion 140 allows significantly improving the mechanical strength of the stator sector 100 at its junction between the trailing edges 112 of the vanes 110 and the external shroud 130. The high static and dynamic stresses are thus better compensated and/or absorbed in this junction zone where the stresses are high.

An annular portion (not shown in FIGS. 3 to 5) similar to the annular portion 140 already described, can also be used to form the upstream edge of the external shroud 130 along the axial direction DA located at the junction with the leading edge 111 of the vanes 110. Depending on the sensitive zones identified, the external shroud of each stator sector can be equipped with an annular portion at its upstream or downstream edge, or with two annular portion forming respectively the upstream edge and the downstream edge of the external shroud.

FIGS. 6 to 8 illustrate another embodiment of a stator sector of the invention which differs from the stator 100 described above in that an annular flexibility portion is present on the internal shroud of the sector.

More precisely, the stator sector 200 which is intended here to form a part of a high-pressure straightener in a turbine comprises a plurality of vanes or of vanes 210 extending along a radial direction DR between a first end 210a and a second end 210b and along an axial direction DA between a leading edge 211 and a trailing edge 212. The sector 200 further comprises an internal shroud 220 linked to the first end 210a of the vanes 210 and an external shroud 230 linked to the second end 210b of the vanes 210. The external shroud 230 includes protruding tabs 231 and 232 offset along the axial direction DA for the assembly of the sector to an external turbine casing.

In conformity with the invention, the stator sector 200 comprises an annular portion 240 forming here the entire internal shroud 220. The annular portion 240 extends along the axial direction DA over a width $D_{240}$ corresponding to the total width of the internal shroud 230 (FIGS. 6 and 8) and over the entire circumferential length $L_{220}$ of the internal shroud 220 (FIG. 4). The annular portion 240 includes a first partition 241 present at the junction with the second end 210b of the vanes 210 and a second partition 242 held spaced from the first partition 241 along the radial direction DR by a three-dimensional structure 243 including a plurality of cutouts 2430 (FIG. 8). In the example described here, the three-dimensional structure 242 consists of an array of crosspieces 2431 defining between them the cutouts 2430.

The first partition 241, which is located both at the junction zone $Z_{J2}$ between the leading edges 211 of the vanes 210 and the internal shroud 220 and at the junction zone $Z_{J3}$ between the trailing edges 212 of the vanes 210 and the internal shroud 220 (FIG. 8), has a small thickness $E_{241}$ in order to contribute flexibility in these stress zones. The first partition 241 preferably presents a thickness of less than 1 mm, more preferably a thickness of approximately 0.2 mm. Due to its geometry, the three-dimensional structure 243 also contributes additional flexibility at the junction zones $Z_{J2}$ and $Z_{J3}$.

By contributing additional flexibility, the portion 240 allows significantly improving the mechanical strength of the stator sector 200 at its junction between the leading 211 and trailing 212 edges of the vanes 110, on the one hand, and the internal shroud 220, on the other hand. The high static and dynamic stresses are thus better compensated and/or absorbed in these junction zones where the stresses are high.

Moreover, in addition to an internal shroud formed by an annular portion like the portion 240, and depending on the sensitive zones identified, the external shroud of each stator sector can be equipped with an annular portion similar to the annular portion 140 previously described at its upstream or downstream edge, or with two annular portions forming respectively the upstream edge and the downstream edge of the external shroud.

The annular portion(s) of the invention can form all or part of the internal shroud or of the external shroud along the axial direction and/or along the circumferential direction of a stator sector.

The annular portion(s) of the invention are produced by additive manufacturing. In fact, the production of partitions having a thickness less than 1 mm at the junctions with the leading and/or trailing edges of the vanes like the partitions 141 and 241 described above by conventional machining techniques has proven difficult to master. In fact, due to manufacturing tolerances linked to machining the thickness of these partitions can in the end be too great to confer the necessary flexibility in the zones in question or too thin, on the other hand, to provide good mechanical strength (deformation, plasticizing, etc.) to the sector. Additive manufacturing offers greater dimensional accuracy, which allows good control of the thickness of the partitions over all the annular portions. Additive manufacturing can be used to produce only the annular portions on the other parts of a stator sector which are produced with conventional techniques such as machining, or to produce the entire stator sector. For additive manufacturing, it is possible in particular to use the laser fusion additive manufacturing method on a powder bed.

Moreover, in the examples described above, the three dimensional structure of the annular portions consists of an array of crosspieces. However, the three-dimensional structure can have other geometries than crosspieces. Any three-dimensional geometry allowing the contribution of mechanical flexibility can be contemplated. For example, the dimensional structure can have an array of cavities in place of an array of crosspieces.

In addition to contributing additional flexibility, the three dimensional structure allows, due to its array of cutouts, advantageously reducing the stress gradients created between the annular portion(s) and the vanes during the construction of the part by additive manufacturing. In fact, though attenuated by heat treatment, the gradients induced by the proximity of the thin parts to the massive parts are harmful for the mechanical strength of the part because they are located in highly loaded zones.

In the present invention, the ring sector is produced in a single piece, which signifies that all the elements constituting a stator sector according to the invention are integral. In other words, the stator sector according to the invention comprises vanes integral with an internal shroud and with an external shroud, the annular portion(s) forming all or part of the internal shroud and/or the external shroud being in a single piece with the shroud in question.

The invention claimed is:

1. A turbine stator sector comprising a plurality of vanes extending along a radial direction between a first end and a second end and along an axial direction between a leading edge and a trailing edge, said sector further comprising an internal shroud linked to the first end of the plurality of vanes and an external shroud linked to the second end of the plurality of vanes,
wherein the turbine stator sector comprises at least one annular portion forming all or part of the internal shroud or of the external shroud, said at least one annular portion comprising a first partition at a junction with the first or second end of the plurality of vanes and a second partition held spaced from the first partition along the radial direction by a three dimensional structure, wherein the internal shroud includes a fore end and an aft end, wherein the three dimensional structure of the external shroud extends past the aft end of the internal shroud, wherein the at least one annular portion of the external shroud extends past a terminal end of one or more protruding tabs along the axial direction, wherein the three dimensional structure includes a plurality of cutouts, and wherein vanes of the plurality of vanes are integral with the internal shroud and with the external shroud, and the at least one annular portion being in a single piece with the internal shroud or the external shroud.

2. The stator sector according to claim 1, wherein the first partition has a thickness of less than 1 mm.

3. The stator sector according to claim 1, wherein the three-dimensional structure consists of an array of crosspieces or of cavities.

4. The sector according to claim 1, wherein a downstream end of the external shroud is formed by the at least one annular portion, the first partition of the at least one annular portion being linked to the second end of the plurality of vanes at the trailing edge of said plurality of vanes.

5. The sector according to claim 1, wherein the internal shroud is entirely formed by an annular portion, the first partition of the annular portion being linked to the first end of the vanes.

6. A turbomachine stator comprising a plurality of turbine stator sectors according to claim 1.

7. A turbomachine compressor equipped with the turbomachine stator according to claim 6.

8. A turbomachine equipped with the turbomachine compressor according to claim 7.

9. The stator sector according to claim 1, wherein the first partition of the at least one annular portion is in rigid connection with the first end or the second end of the plurality of vanes.

10. The stator sector according to claim 1, wherein the plurality of vanes are fixed relative to the inner shroud and external shroud.

* * * * *